United States Patent [19]

Kubota et al.

[11] Patent Number: 5,709,446
[45] Date of Patent: Jan. 20, 1998

[54] DISPLAY DEVICE FOR USE IN A VEHICLE

[75] Inventors: Minoru Kubota; Keizo Nishitani, both of Shizuoka, Japan

[73] Assignee: Yazaki Corporation, Tokyo, Japan

[21] Appl. No.: 613,195

[22] Filed: Mar. 8, 1996

[30] Foreign Application Priority Data

Mar. 13, 1995 [JP] Japan .................... 7-052585

[51] Int. Cl.$^6$ ...................... G01D 11/28
[52] U.S. Cl. ................. 362/30; 362/85; 362/29; 116/286
[58] Field of Search ............ 362/26, 27, 29, 362/30, 85, 61, 80, 23; 116/286

[56] References Cited

U.S. PATENT DOCUMENTS

| | | |
|---|---|---|
| 2,022,175 | 11/1935 | Allee .................... 116/286 |
| 2,906,232 | 9/1959 | Le Van et al. ............ 362/29 |
| 3,053,337 | 9/1962 | Prohaska et al. ......... 362/29 |
| 4,217,625 | 8/1980 | Klein ..................... 362/29 |
| 5,243,194 | 9/1993 | Sano et al. ............ 116/286 |
| 5,406,303 | 4/1995 | Salmon et al. .......... 362/26 |

FOREIGN PATENT DOCUMENTS

| | | |
|---|---|---|
| 0001527 | 1/1980 | Japan ................... 116/286 |
| 4266537 | 9/1992 | Japan . |
| 7246860 | 9/1995 | Japan . |

*Primary Examiner*—Thomas M. Sember
*Attorney, Agent, or Firm*—Sughrue, Mion, Zinn, Macpeak & Seas, PLLC

[57] ABSTRACT

A display device for use in a vehicle includes display lamps for displaying various states, and a centralized control substrate on which electronic parts for driving the display lamps are mounted. The centralized control substrate is extended backwardly of the display lamps in a direction to visually recognize the display lamps.

11 Claims, 4 Drawing Sheets

DISPLAY DEVICE FOR USE IN A VEHICLE

BACKGROUND OF THE INVENTION

The present invention relates to a display device for use in a vehicle and, in particular, to a display device for use in a vehicle which comprises meters, display lamps, a centralized control substrate in which electronic parts for driving the meters and display lamps are mounted, and other components.

A convention display device in disclosed in Japanese Patent Unexamined Publication No. Hei. 4-266537, shown in FIG. 4.

The display device for use in a vehicle includes a cluster 20 formed of plastic or the like, meters (not shown) contained in the interior of the front surface of the cluster 20, and, normally, switches (not shown) mounted on the right and left portions of the cluster 20.

Also, on the back surface portion of the cluster 20 in which the meters are contained, there is mounted a flexible wiring board 21 on which electric wires are formed. On the terminal portion 21a of the wiring board 21, there is mounted a control substrate 23 on which there are arranged electronic parts 22 necessary for control of the meters and switches.

Further, in the flexible wiring board 21, there are formed a large number of holes 21b around which wiring patterns 21c are provided respectively. At the positions of the flexible wiring board 21 that are opposed to the holes 21b, similarly, there are formed holes, so that, by fitting the display lamps into the latter holes, the lighting and warning of the meters contained in the cluster 20 can be carried out. That is, the latter holes serve as the sockets of the display lamps.

However, as in the display device for use in a vehicle of this type, when the flexible plug board 21 provided on the back surface of the cluster 20 is used to arrange a module structure around the meters, since the electronic parts 22 on the control substrate 23 are exposed externally, there is a fear that the electronic parts 22 can be damaged when they are moved, thereby lowering the reliability of the display device.

Also, in such module structure, since electricity and signals are to be supplied by the flexible wiring board 21 to the remaining electronic parts, such module structure is not able to cope with a case when electricity and signals respectively of large power must be supplied. Further, the design and manufacture of the module structure must be changed each time the types of vehicles, the grades of vehicles and part of the specification of a vehicle are changed. That is, the module structure leads to the small-quantity/wide-variety production, which in turn results in an increase in the cost of the display device employing such module structure.

In view of the above, the present applicant has already proposed a display device for use in a vehicle which will be described below (Japanese Patent Unexamined Publication No. Hei 7-246860). The proposed display device described below and shown in FIGS. 5 and 6 is not prior art for this U.S. application.

The proposed display device for use in a vehicle, as shown in an exploded perspective view of FIG. 5, comprises a meter board 30 with meters and display lamps mounted thereon, a centralized control substrate unit 33, switch units 34 and 34' in which switches for on-board electric parts including the meters and display lamps are incorporated, a finish panel 35 which can be mounted on an instrument panel after the above-mentioned parts are assembled, and the like.

FIG. 6 is a sectional view of the display device shown in FIG. 5 when it is viewed from the side surface thereof. As can be seen from FIG. 6, the centralized control substrate unit 33 includes a centralized control substrate 31 and a case 32 for containing the centralized control substrate 31 therein. The centralized control substrate 31 incorporates therein electronic parts which are used to supply power and distribute input/output signals to the above-mentioned on-board electric parts as well as to control the power supply and signal distribution.

The centralized control substrate unit 33, as shown in FIG. 5, is structured in a flat-plate-shaped box having a small thickness and includes on the upper surface 33a thereof wedge-shaped guide grooves 33b and 33b' for mounting the meter board 30. Also, on the left and right end portions of the unit 33, there are mounted connectors 33d and 33d' for mounting the switch units 34 and 34' in such a manner that the fitting portions of the connectors 33d and 33d' face forward, and there are also formed holes 33e and 33e' which are used to fix the switch units 34 and 34'. Further, on the central portion of the unit 33, there is mounted a connector 33f to be connected to the meter board 30 in such a manner that the fitting portion of the connector 33f faces forward.

On the other hand, in the lower central portion of the meter board 30, there is provided a connector 30f which can be fitted with the connector 33f of the centralized control substrate unit 33. If these connectors are fitted with each other, then the power and signals can be supplied from the centralized control substrate unit 33 side to the meters contained within the meter board 30 and to the flexible wiring board 36 provided on the back surface of the meter board 30 as shown in FIG. 6, so that the meters can be operated and the lamps can be lighted.

In this manner, due to the fact that the centralized control substrate unit 33 incorporating therein the function circuits used to control the meters and display lamps is combined with the switch units 34 and 34' into an integrated body, the display device for a vehicle can be reduced in weight and size and is able to easily cope with the various types and grades of vehicles as well as with the addition of the electric parts, which makes the display device suitable for wide-variety production.

However, in the proposed device described above, as shown in FIG. 6, since the centralized control substrate unit 33 is disposed in the lower portion of the meter board 30, not only the upper portion of the case 32 must be concealed by covering the lower portion of the meter shield 30a with a meter inside plate or the like, but also the front portion of the case 32 must be concealed by covering it with the finish panel 35.

For this reason, in the portion of the display device that is situated inside the finish panel 35 and in front of the case 32, there is produced a dead space having a height corresponding to the thickness A of the case 32 and having a width equivalent to the width of the case 32, which makes it hard to make the best use of the shape of this display device for use in a vehicle.

Also, in the above display device being proposed, since the signal currents for the display lamps are transmitted from the centralized control substrate 31 through the flexible wiring board 36 provided on the back surface of the meter board 30, the wiring of the flexible plug board 36 must be taken into consideration. Also, due to use of the flexible wiring board 36, there is some room to be improved in the supply of the electric power and signals of large power.

SUMMARY OF THE INVENTION

Accordingly, it is an object of the invention to provide a display device for use in a vehicle of a type that a centralized control substrate for controlling meters and display lamps is disposed in the lower portion of the display device, which can make effective use of space, can simplify the wiring of signal lines, and can improve the maintenance thereof.

In attaining the above object, according to the invention, there is provided a display device for use in a vehicle which comprises display lamps for displaying various states and a centralized control substrate with electronic parts therein for driving the display lamps, characterized in that the centralized control substrate is extended backwardly of the display lamps in a direction to visually recognize the display lamps.

Also, according to the invention, the display lamps are mounted on a front portion of the centralized control substrate.

Further, according to the invention, the front portion of the centralized control substrate projects forwardly in the display lamp visual recognition direction from a case for the centralized control substrate, the display lamps are mounted on the projecting portion of the centralized control substrate, and a lamp housing for covering the centralized control substrate projecting portion is disposed continuously with the front portion of the case for the centralized control substrate.

Moreover, according to the invention, the lamp housing is opened forwardly in the display lamp visual recognition direction, and an indicator plate designed for the uses of the display lamps is disposed at the opened portion of the lamp housing in such a manner that it covers the lamp housing opened portion.

In addition, according to the invention, in the lamp housing, there is formed a service hole for replacement of the display lamps.

According to the invention, since the centralized control substrate is disposed backwardly in the display lamp visual recognition direction, when the front surface of the display device for a vehicle is covered by a finish panel or the like, a wasteful dead space is prevented from being produced between the centralized control substrate and finish panel, and a space in front of the centralized control substrate can be used effectively by the display lamps, thereby being able to improve the outer appearance and design quality of the display device.

Also, according to the invention, because the display lamps are mounted directly in the centralized control substrate, there is no need to provide a signal relay base plate or the like between the centralized control substrate and the display lamps, which makes it possible to supply electricity and signals of large power, to simplify the wiring of the signal lines, and to enhance the reliability of the circuits used.

Further, since the lamp housing is disposed continuously with the case of the centralized control substrate, there is no need to provide a similar structure on the meter board side where the meters are disposed, which eliminates from the meter board the elements that must be changed according to the types and grades of vehicles and the like, thereby being able to use the meter board in common.

In addition, due to provision of the service hole in the lamp housing, the replacement of the display lamps can be easily executed from the front side of the display device.

DETAILED DESCRIPTION OF THE INVENTION

Figure 1A:
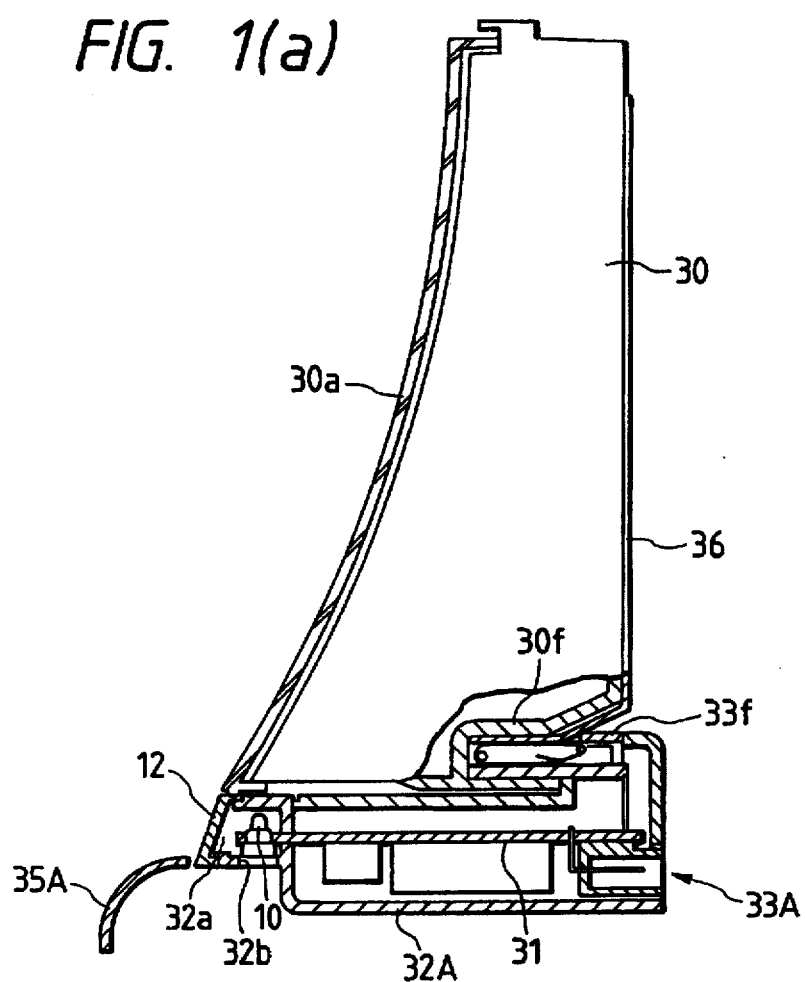
FIG. 1(a) is a sectional view of an embodiment of a display device for a vehicle according to the invention.

Preferred embodiments of a display device for use in a vehicle according to the present invention will now be described with reference to the accompanying drawings.

In the following description, the same or equivalent parts as those discussed before in the description of the "Background of the Invention" section are given the same reference characters.

Figure 1B:
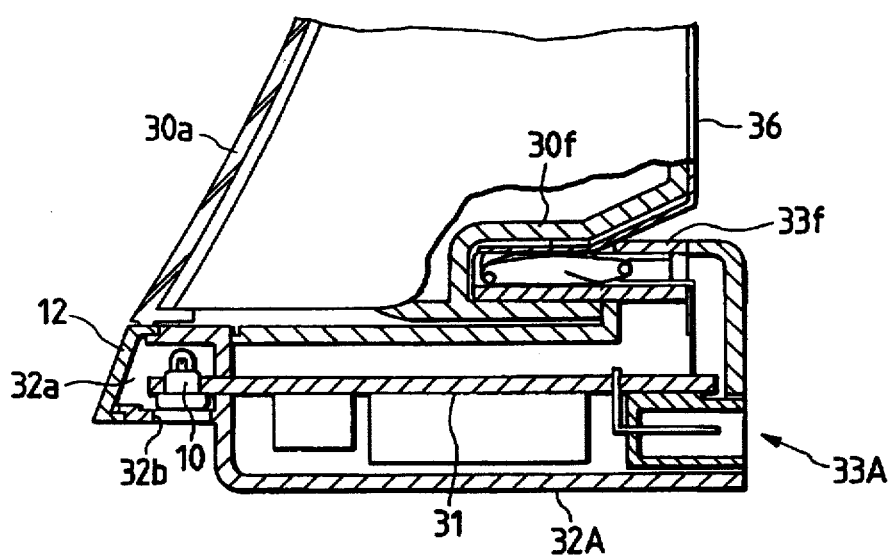
FIG. 1 (b) is a partially enlarged view of FIG. 1(a)

FIG. 1(a) is a sectional view of an embodiment of a display device for use in a vehicle according to the invention, while FIG. 1(b) is a partially enlarged view of FIG. 1(a).

Figure 6:
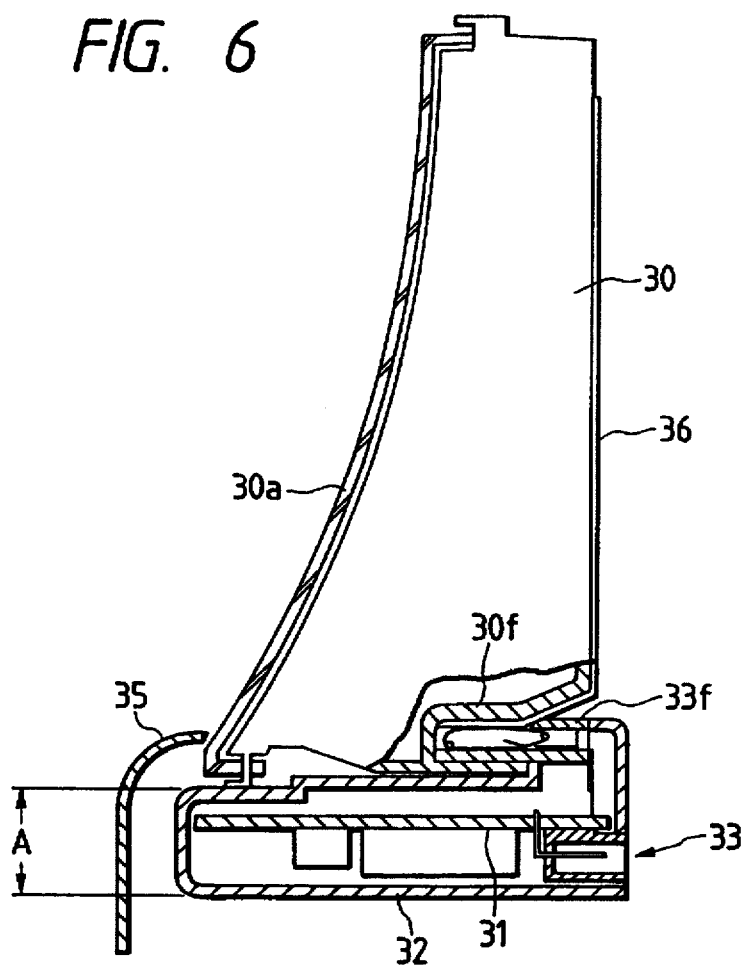
Figure 5:
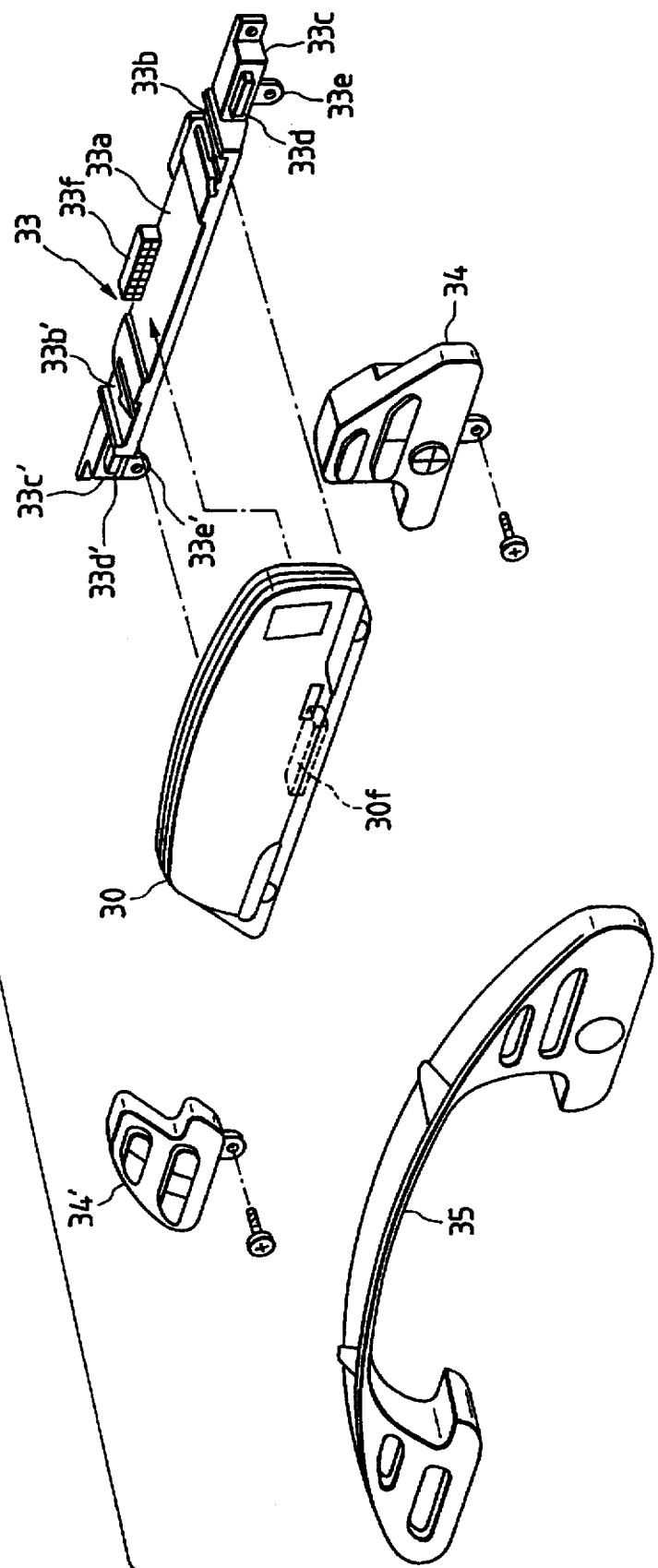
FIG. 5 is an exploded perspective view of a proposed display device for a vehicle, when viewed from the back surface side thereof; and, FIG. 6 is a section view of the display device for a vehicle shown in FIG. 5, after it is assembled.

The display device for use in a vehicle according to the present embodiment comprises a meter board 30 similar to the meter board employed in the display device for use in a vehicle shown in FIGS. 5 and 6, and a centralized control substrate unit 33A and a finish panel 35A which are respectively different from those employed in the conventional display device for use in a vehicle.

Meters and display lamps are mounted on the meter board 30 and, in the lower central portion of the meter board 30, there is provided a connector 30f which is fittable with a connector 33f provided in the centralized control substrate unit 33A to be discussed later. If these connectors are fitted with each other, then electricity, signals and the like are supplied from the centralized control substrate unit 33A side to the meters contained in the meter board 30 and to a flexible wiring board 36 provided on the back surface of the meter board 30, so that the meters can be operated and the display lamps can be turned on.

Figure 2:
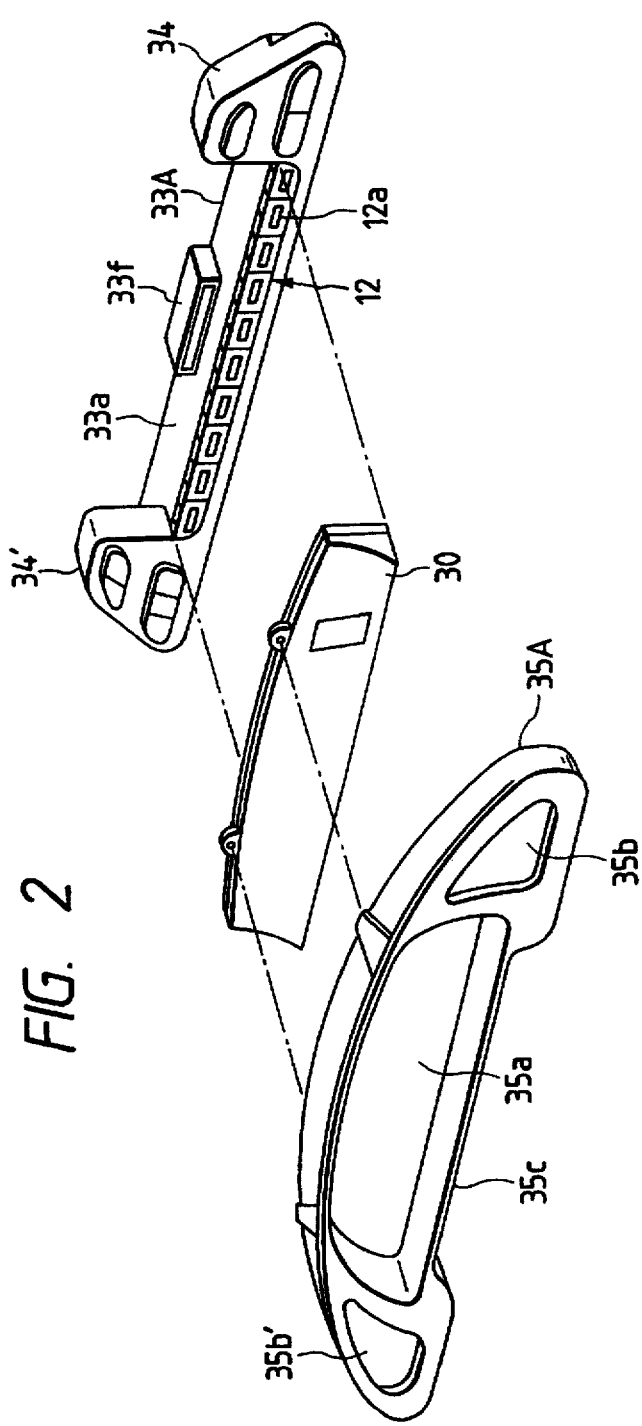
FIG. 2 is an exploded perspective view of the display device for a vehicle shown in FIG. 1.

The centralized control substrate unit 33A is an integrated unit of the conventional centralized control substrate unit 33 and switch units 34, 34' and, therefore, as shogun in the exploded perspective view of FIG. 2, there are omitted the connectors 33d, 33d' for mounting the switch units 34, 34' and the holes 33e, 33e' for fixing the switch units 34, 34', which are all provided in the conventional centralized control substrate unit 33.

In the centralized control substrate unit 33A, there are further omitted the wedge-shaped guide grooves 33b, 33b' that are formed on the left and right sides of the upper surface 33a of the conventional centralized control substrate unit 33, whereas only the connector 33f provided in the central portion of the upper surface 33a is left similarly to the conventional centralized control substrate unit 33.

In the centralized control substrate unit 33A according to the present embodiment, as shown in FIG. 1, the dimension of the case 32A between the front and the rear thereof is set shorter than that of the conventional case 32, the position of the front end of the case 32A is shifted backwardly and, in the shifted end portion of the case 32A, there is provided a forwardly opened lamp housing 32a in such a manner that it extends between the left and right switch unit portions 34A and 34A' respectively corresponding to the conventional switch units 34 and 34'.

Within the lamp housing 32a, there is disposed the front end portion of a centralized control substrate 31 that projects from the case 32A and, on the projecting front end portion of the centralized control substrate 31, there are mounted a plurality of display lamps 10 through sockets (not shown) in such a manner that they are spaced from one another in the right and left direction, while the display lamps 10 can be replaced through a service hole 32b formed in the bottom surface of the lamp housing 32a.

Also, an indicator plate 12 is fitted into an opening formed in the front portion of the lamp housing 32a. According to the present structure, the connector 33f of the centralized control substrate unit 33A is fitted and connected with the connector 30f of the meter board 30 and the indicator plate 12 is fitted into the opening formed in the front portion of the lamp housing 32a, while the meter board 30 and the front surface of the indicator plate 12 substantially continue with each other in the vertical direction.

Here, as shown in FIG. 2, there are fitted into the indicator plate 12 color filters 12a which are designed according to the uses of the display lamps 10, while the number of the color filters 12a is equal to the number of the display lamps 10.

The finish panel 35A includes a central opening 35a formed in the central portion thereof, two side openings 35b respectively formed on either side of the central opening 35a, and a recessed portion 35c formed below the central opening 35a.

Figure 3:
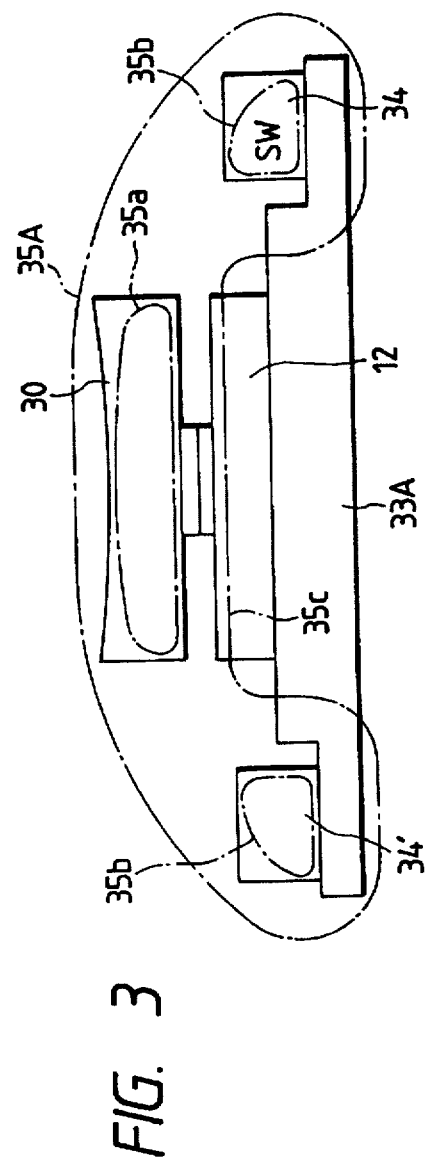
FIG. 3 is a schematic view of a portion of the display device for a vehicle that can be visually recognized through a finish panel shown in FIG. 2.
Figure 4:
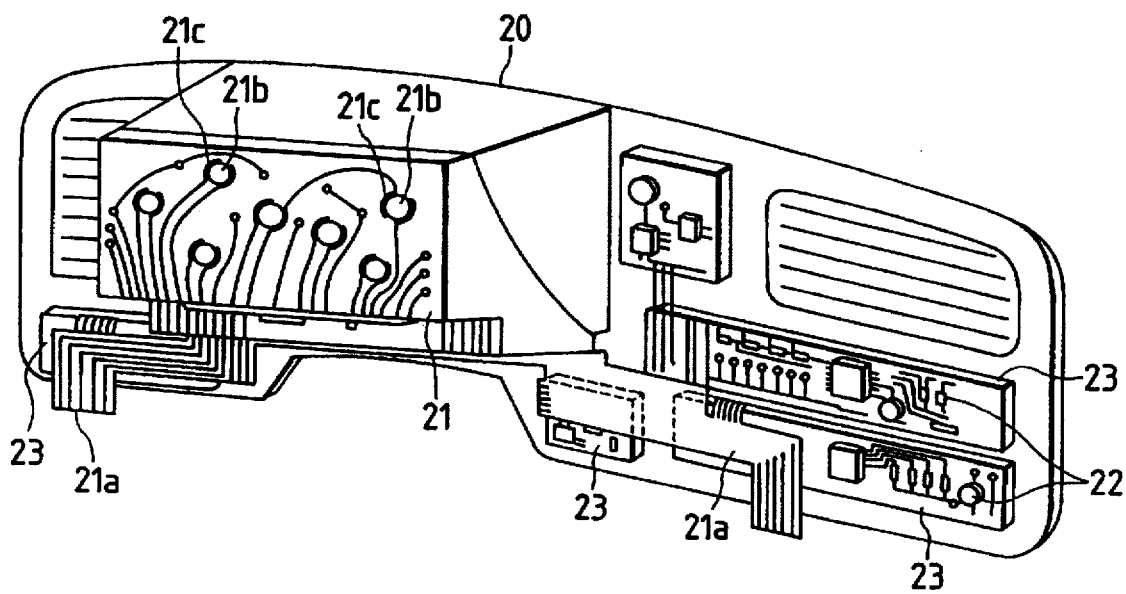
FIG. 4 is a perspective view of a conventional display device for a vehicle, when viewed from the back surface side thereof.

In the thus structured display device for use in a vehicle according to the present embodiment, the connector 33f of the centralized control substrate unit 33A is fitted and connected with the connector 30f of the meter board 30 and, in this fitted and connected condition, the finish panel 35 is fitted with them to thereby assemble the whole display device, whereby, as shown by a schematic view of FIG. 3, the meter board 30 is located behind the opening 35a, the two switch units 34 and 34' respectively are located behind the two side openings 35b, and the indicator plate 12 is located behind the recessed portion 35c in such a manner that they can be visually recognized from the front surface of the finish panel 35A.

In this manner, in the display device for use in a vehicle according to the present embodiment, the display lamps 10 are respectively located in the front portion of the centralized control substrate 31 situated in the lower portion of the centralized control substrate unit 33A, and the forwardly opened lamp housing 32a for covering the front portion of the centralized control substrate 31 is provided in the front portion of the case 32A for containing therein the whole portion of the centralized control substrate 31 except for the front portion thereof, so that the indicator plate 12 with filters to be fitted into the opening of the lamp housing 32a and the meter board 30 situated on the centralized control substrate 33A can be visually recognized through the recessed portion 35c formed in the lower portion of the finish panel 35A and the central opening 35a situated upwardly of the recessed portion 35c.

This structure makes it possible to make effective use of the front portion of the case 32A of the centralized control substrate unit 32A as the lamp housing 32a, although such portion has been conventionally covered with the finish panel to provide a factor in producing a dead space inside the finish panel. As a result of this, since there is eliminated the need to locate the display lamps 10 within the meter board 30, the dimensions of the meter board 30 can also be reduced.

Also, in the display device for use in a vehicle according to the present embodiment, since the lamp housing 32a is situated in the front portion of the case 32A and the service hole 32b is formed in the bottom surface of the lamp housing 32a, the display lamps 10 can be replaced from the front side of the finish panel 35A through the service hole 32b, thereby being able to enhance the operationability of the display device in the maintenance thereof.

Further, according to the present embodiment, because the display lamps 10 are disposed outside the meter board 30, even if the display lamps 10 that must be changed in the contents and number thereof according to the types, grades and the like of the vehicles, must be replaced together with the centralized control substrate unit 33A including the centralized control substrate 31 that must be changed according to the types and grades of the vehicles similarly to the display lamps 10, the meter board 30 need not be replaced, so that the meter board 30 can be used in common regardless of the types and grades of the vehicles. This can reduce the kinds of the meter board 30 to thereby lower the costs of the meter board 30 and, when the meter board 30 is assembled, there can be reduced the number of operations to assemble the meter board 30 to other components of the display device.

Since the display lamps 10 are mounted directly on the centralized control substrate 31, signals and currents can be supplied directly to the display lamps 10 from the centralized control substrate 31 with no intervention of a signal relay substrate such as a flexible wiring board or the like between them. This makes it possible to supply electricity and signals of large power, to enhance the reliability of the circuits to a degree equivalent to the omission of the signal relay substrate, and to simplify or omit the wiring of the signal lines.

In the present embodiment, although the display lamps 10 are mounted on the upper surface side of the centralized control substrate 31, according to the invention, the display lamps 10 can be arbitrarily mounted on either of the upper or lower surface side of the centralized control substrate 31.

As has been described heretofore, according to the invention, there is provided a display device for a vehicle which comprises display lamps for displaying various states, a centralized control substrate with electronic parts mounted thereon for driving the display lamps, and the like, in which the centralized control substrate is extended backwardly of the display lamps in a direction to visually recognize the display lamps.

Therefore, when the front surface of the present display device for use in a vehicle is covered with a finish panel or the like, there is eliminated the possibility that a wasteful dead space can be produced between the centralized control substrate and the finish panel, so that the space in front of the centralized control substrate can be used effectively by the display lamps, thereby being able to improve the outer appearance and design quality of the present display device.

Also, according to the invention, since there is employed a structure that the display lamps are mounted in front of the centralized control substrate, there is eliminated the need to interpose a signal relay substrate or the like between the centralized control substrate and the display lamps. Due to this, electricity and signals of large power can be supplied, the wiring of the signal lines can be simplified, and the reliability of the circuits can be enhanced.

Further, according to the invention, there is employed a structure that the front portion of the centralized control substrate projects forwardly in the above-mentioned display lamp visual recognition direction from the centralized control substrate, the display lamps are mounted in the projecting front portion of the centralized control substrate, and a lamp housing for covering the projecting front portion of the centralized control substrate is disposed continuously with the front portion of the case. This eliminates the need to provide a similar structure on the meter board side of the display device in which the meters are located, and removes, from the meter board, the factor which causes the contents of the meter board to vary according to the types, grades and the like of the vehicles, thereby being able to realize the common use of the meter board.

Also, according to the invention, since there is formed a service hole for replacement of the display lamps, the display lamps can be replaced easily from the front side of the present display device.

What is claimed is:

1. A display device for a vehicle, comprising:

a meter board having at least one display meter;

a wiring board disposed on a rear side of said meter board and facing a rearward direction;

display lamps for displaying various operating conditions of said vehicle to a viewer on a front side of said meter board;

a control unit positioned below said meter board, said control unit including a substantially planar centralized control substrate to which electronic means is secured for supplying power to said at least one meter, via said wiring board, and to said display lamps, wherein said display lamps are positioned on a front side of said planar substrate.

2. A display device for use in a vehicle as set forth in claim 1, wherein said display lamps are directly mounted on a front portion of said centralized control substrate.

3. A display device for use in a vehicle as set forth in claim 2, further comprising a lamp housing for covering said display lamps, and a case for containing said centralized control substrate, said lamp housing being disposed continuously with a front portion of said case in said visual recognition direction.

4. A display device for use in a vehicle as set forth in claim 3, wherein said lamp housing has an opening portion at a front side in said visual recognition direction, and wherein said display device further comprises an indicator plate designed for uses of said display lamps, said indicator plate being disposed at said opening portion of said lamp housing so as to cover said lamp housing.

5. A display device for use in a vehicle as set forth in claim 4, wherein said lamp housing includes a service hole for replacement of said display lamps.

6. A display device for use in a vehicle as set forth in claim 3, wherein said lamp housing includes a service hole for replacement of said display lamps.

7. A display device for use in a vehicle as set forth in claim 1, further comprising a lamp housing for covering said display lamps, and a case for containing said centralized control substrate, said lamp housing being disposed continuously with a front portion of said case in said visual recognition direction.

8. A display device for use in a vehicle as set forth in claim 7, wherein said lamp housing has an opening portion at a front side in said visual recognition direction, and wherein said display device further comprises an indicator plate designed for uses of said display lamps, said indicator plate being disposed at said opening portion of said lamp housing so as to cover said lamp housing.

9. A display device for use in a vehicle as set forth in claim 3, wherein said lamp housing includes a service hole for replacement of said display lamps.

10. A display device for use in a vehicle as set forth in claim 7, wherein said lamp housing includes a service hole for replacement of said display lamps.

11. The display device of claim 1, wherein said centralized control substrate is located in a substantial horizontal plane.

* * * * *